United States Patent
Morgandi

(10) Patent No.: US 8,176,839 B2
(45) Date of Patent: *May 15, 2012

(54) APPLIANCE FOR PRODUCING HOT DRINKS

(75) Inventor: Arturo Morgandi, Bergamo (IT)

(73) Assignee: Tenacta Group S.p.A., S Paolo (BG) (IT)

( * ) Notice: Subject to any disclaimer, the term of this patent is extended or adjusted under 35 U.S.C. 154(b) by 999 days.

This patent is subject to a terminal disclaimer.

(21) Appl. No.: 11/914,730

(22) PCT Filed: May 12, 2006

(86) PCT No.: PCT/EP2006/004484
§ 371 (c)(1),
(2), (4) Date: May 20, 2008

(87) PCT Pub. No.: WO2006/122720
PCT Pub. Date: Nov. 23, 2006

(65) Prior Publication Data
US 2008/0264264 A1 Oct. 30, 2008

(30) Foreign Application Priority Data
May 17, 2005 (WO) .................. PCT/IT2005/000279

(51) Int. Cl.
*A47J 31/56* (2006.01)
(52) U.S. Cl. ........................... 99/282; 99/281; 99/302 R
(58) Field of Classification Search ................. 99/281, 99/282, 302 R, 280
See application file for complete search history.

(56) References Cited

U.S. PATENT DOCUMENTS

| | | | |
|---|---|---|---|
| 3,100,434 A | 8/1963 | Bunn | |
| 4,583,449 A | 4/1986 | Dangel et al. | |
| 4,613,745 A | 9/1986 | Marotta et al. | |
| 5,440,972 A * | 8/1995 | English | 99/282 |
| 5,551,331 A | 9/1996 | Pfeifer et al. | |
| 5,738,001 A * | 4/1998 | Liverani | 99/283 |
| 6,164,189 A | 12/2000 | Anson et al. | |
| 7,401,545 B2 * | 7/2008 | Hu et al. | 99/281 |
| 7,673,556 B2 * | 3/2010 | Spencer | 99/283 |
| 2005/0066820 A1 | 3/2005 | Lussi | |
| 2005/0076788 A1 * | 4/2005 | Grant et al. | 99/279 |

FOREIGN PATENT DOCUMENTS

| DE | 4435100 A1 | 4/1996 |
|---|---|---|
| JP | 2004332985 | 11/2004 |

OTHER PUBLICATIONS

International Search Report for PCT/EP2006/004484.
Patent Abstracts, JP, Nov. 30, 1998, Matsushita Electric Ind Co Ltd.

* cited by examiner

Primary Examiner — Reginald L Alexander
(74) Attorney, Agent, or Firm — Husch Blackwell LLP

(57) ABSTRACT

An appliance for producing hot drinks comprising a water heating device; a heating source; a seat adapted to receive a product for preparing the drink; a duct for feeding hot water from the water heating device to the seat; a control device operatively associated with the heating source for adjusting the temperature of the water contained in the water heating device; and a compensating device to dynamically compensate for temperature drop undergone by the water flowing along the duct from the water heating device to the seat.

9 Claims, 7 Drawing Sheets

APPLIANCE FOR PRODUCING HOT DRINKS

CROSS-REFERENCE TO RELATED APPLICATIONS

This application claims priority from international application PCT/EP2006/004484 filed 12 May 2006 which claims priority to international application PCT/IT2005/000279 filed on 17 May 2005.

DESCRIPTION

The present invention relates to an appliance for producing hot drinks such as, for example, coffee, tea, milk, chocolate, cappuccino, barley coffee, infusion.

Appliances for producing hot drinks known in the art typically comprise a water tank at atmospheric pressure, a boiler (or an instant hot water generator) comprising an electrical resistance for heating the water, a pump for feeding water from the tank to the boiler, a seat for containing the product for producing the drink and a duct for providing hot water under pressure from the boiler to the seat containing the product, so as to produce the hot drink through the flow of hot water through the product contained into the seat.

The product may be, for example, in the form of loose powder, granules or small leaves or pre-packaged into suitable bags, wafers or capsules.

The boiler is typically associated with a temperature sensor for directly or indirectly sensing the temperature of water contained therein and with a control device adapted to switch on/switch off the electrical resistance based on the temperature detected by the temperature sensor so as to keep the water temperature into the boiler at a predefined temperature.

The Applicant has noted that the quality of hot drinks produced by known appliances is not constant and that, in general, it varies according to the operating condition of the appliance. In particular, the quality of the hot drink is typically worse when the appliance is switched on or when the appliance, even if kept on, is used for the production of a limited number of drinks, at relatively long time intervals. Quality, on the other hand, generally improves as the number of drinks subsequently produced, one after the other, increases.

Moreover, the Applicant noted that the quality of hot drinks produced by known appliances may also depend upon climatic conditions of the outside environment.

Accordingly, the Applicant faced the technical problem of providing an appliance that allows the quality of the hot drinks produced to be improved.

In particular, the Applicant faced the technical problem of providing an appliance that allows a good quality to be obtained, irrespectively of the operating condition of the appliance and of the climatic conditions of the outside environment.

Thus, in a first aspect thereof, the present invention refers to an appliance for producing hot drinks comprising
  a water heating device comprising a heating source;
  a seat adapted to receive a product for preparing the drink;
  a duct for feeding hot water from the water heating device to the seat;
  a control device operatively associated with the heating source for adjusting the temperature of the water contained in the water heating device;
characterised in that the appliance further comprises a compensating device to dynamically compensate for temperature drop undergone by the water flowing along the duct from the water heating device to the seat.

The appliance of the invention solves the above technical problem as explained below.

The Applicant noted that, in general, in order to optimise the quality of a hot drink, it is important to keep the temperature of hot water reaching the product, and passing therethrough, constantly within a well-defined optimal range of temperatures. This, for example, is especially important for oil-containing products, such as coffee, for which water temperature changes of few degrees (e.g. 2 or 3° C.) with respect to an optimal temperature (e.g. 90° C.) can be enough to alter the quality of the coffee. In particular, water temperatures above the optimal range of temperatures (e.g., higher than 92° C.) can "burn" the oils contained in the product and, thereby, produce a bitterish taste of the drink, while water temperatures below the optimal range of temperatures (e.g., lower than 89° C.) can produce a drink lacking in cream.

However, the applicant observed that the temperature of the hot water that reaches the product can differ from the temperature of the water contained into the water heating device due to a temperature drop undergone by the water while flowing along the duct from the water heating device to the seat containing the product.

The applicant observed that such temperature drop can vary with time in unpredictable way, depending upon the operating conditions of the appliance. In particular, the Applicant noted that, upon the switching on of the appliance or when the appliance, even if kept on, is not used very much, the duct walls are relatively "cold" (e.g., at room temperature or at a temperature lower than the water temperature in the water heating device), so that the heated water that flows therethrough loses heat and reaches the product at a lower temperature than in the water heating device. In turn, when the appliance is used for producing a large number of coffee cups, one after the other, the duct walls heat up so that the heated water flowing therethrough before reaching the product undergoes a lower (or no) temperature drop and reaches the product at a temperature more or less equal to that of the water contained in the water heating device.

The Applicant further noted that the above temperature drop can also vary as the climatic conditions of the outside environment (that can affect the temperature of the duct walls) change.

Said variable temperature drops make the temperature of the hot water reaching the product, and passing therethrough, changing with time in unpredictable way. The temperature of such hot water can, thus, fall outside the well-defined optimal range of temperatures and alter the quality of the produced hot drink.

Accordingly, the appliance of the invention—comprising the compensating device to dynamically compensate for temperature drops undergone with time by the water flowing along the duct—allows the temperature of the water that reaches the product to be constantly kept within a well-defined optimal range of temperatures thereby optimising the quality of the produced hot drinks, independently from the operating conditions of the appliance and the climatic conditions of the outside environment.

In the present description and claims, the expression "compensating device to dynamically compensate for temperature drop" is used to indicate a compensating device adapted to perform a temperature drop compensation varying with time. Advantageously, it is used to indicate a compensating device adapted to compensate for temperature drops changing with time in unpredictable way.

Advantageously, the compensating device is adapted to detect a quantity indicative of the temperature drop undergone by the water flowing along the duct.

Preferably, the quantity is correlated to the temperature of at least one point of the duct.

Preferably, the control device is operatively connected to the compensating device so as to dynamically adjust the temperature of the water contained in the water heating device based on the quantity detected by the compensating device.

The temperature of the water contained in the water heating device is advantageously continuously adjusted by taking into account temperature drops undergone with time by the water flowing through the duct, thereby compensating for any temperature drop undergone by water as the operating conditions of the appliance and the climatic conditions of outside environment change.

Advantageously, the control device is adapted to continuously control (e.g., every 0.1 or 0.01 s) the quantity detected by the compensating device and, at each control, to determine an optimum temperature value at which bringing the water in the water heating device, based on the quantity detected by the compensating device, and to switch the heating source on/off so that the water temperature in the water heating device approaches the optimum temperature determined.

The above optimum temperature value is advantageously determined by means of a predefined algorithm that allows obtaining the value at which bringing the water in the water heating device, based on the quantity detected by the compensating device, in order to obtain an optimum production temperature for the water that reaches a predetermined type of product contained in the seat.

Preferably, the appliance comprises selection means to allow the user to select a desired type of product among a plurality of products.

Advantageously, the control device is adapted to determine the optimum temperature value at which the water in the water heating device must be brought based on the quantity detected by the compensating device, according to the type of product selected by the user through said selection means.

Typically, the appliance of the invention further comprises a temperature sensor. The temperature sensor is advantageously associated with the water heating device to detect (directly or indirectly) the temperature of the water contained therein.

Advantageously, the control device is adapted to adjust the temperature of the water in the water heating device based on the temperature detected by said temperature sensor.

Advantageously, the temperature sensor is arranged inside the water heating device. This advantageously allows directly detecting the temperature of the water contained in the device. Preferably, it is arranged inside the device, in the proximity of the water outlet towards the duct. This advantageously allows directly detecting the temperature of the water coming out of the device.

According to a variant, the temperature sensor is arranged on the outer wall of the water heating device (thereby indirectly detecting the temperature of the water contained in the water heating device).

According to a first preferred embodiment, the compensating device comprises a temperature sensor associated with the duct. According to this embodiment, the quantity detected by the compensating device is the temperature detected by said temperature sensor and the control device is adapted to continuously adjust the temperature of the water in the water heating device based on such duct temperature.

Typically, the temperature sensor associated with the duct is arranged on the outer wall of the duct, at a predetermined point along the duct.

Advantageously, the compensating device comprises at least one further temperature sensor associated with the duct, the temperature sensor and said at least one further temperature sensor being arranged in different positions along the duct for detecting the temperature at two different positions of the duct. According to this embodiment, the control device is advantageously adapted to continuously adjust the temperature of the water in the water heating device also based on the temperature detected by said at least one further temperature sensor. As described is detail hereinafter in the description, the choice of using one or more sensors associated with the duct could depend on various factors, among which the duct length and the duct arrangement inside the appliance relative to the water heating device containing the heating source.

According to a second preferred embodiment, the compensating device is adapted to keep at least one point of the duct at a prefixed temperature.

Advantageously, the compensating device is adapted to determine the amount of energy required to keep said at least one point of the duct at said prefixed temperature.

According to this embodiment, the quantity detected by the compensating device is said amount of energy and the control device is adapted to adjust the temperature of the water in the water heating device based on the determined energy amount.

Advantageously, the compensating device comprises a heating element to heat said at least one point of the duct.

Advantageously, the compensating device further comprises a temperature sensor adapted to detect the temperature of the heated point of the duct. Advantageously, the compensating device further comprises a control element adapted to continuously check the temperature detected by the temperature sensor and to operate the heating element so as to approach the temperature detected by temperature sensor to the prefixed temperature. Advantageously, said control element is also adapted to determine the amount of energy required to keep said at least one point of the duct at the prefixed temperature.

It is noted that in this second embodiment of the compensating device, the amount of energy required to keep said at least one point of the duct at the predetermined temperature is correlated to the temperature of the duct. In particular, it is inversely proportional to the temperature of the duct. Indeed, relatively "cold" duct walls (e.g., at the switching on of the appliance or when only few hot drinks are prepared) will require a higher amount of energy than relatively "hot" duct walls (e.g., when many hot drinks are prepared in sequence).

Accordingly, the control device—by continuously adjusting the water temperature in the water heating device depending upon the amount of energy required with time to keep said point at the prefixed temperature—allows continuously adapting the adjustment of the water temperature in the water heating device based on the instantaneous thermal conditions of the walls of the duct.

Moreover, this second embodiment—by keeping at least one point of the duct at a prefixed temperature (e.g., at about 105-110° C.)—has the advantage of reducing the adjustment field of water temperature in the water heating device and improving the adjustment of the water temperature therein.

Indeed, in the first embodiment, at the switching on of the appliance, when all the components of the appliance—and in particular the duct walls—are at ambient temperature, the water in the water heating device should be brought at a relatively high starting temperature (e.g., about 140° C.) in order to compensate for a relatively high temperature drop along the duct and to have the temperature of water reaching the product in the seat, producing the first hot drink, within the optimal range of temperatures (e.g., about 89-92° C.). On the other hand, at the immediately subsequent drink, when all the components of the appliance—and in particular the duct walls—have been heated by the passage of hot water through the duct, the water in the water heating device should be suddenly brought at a lower temperature (e.g., about 100° C.) to compensate for a lower temperature drop along the duct and to keep the temperature of water reaching the product in the seat within the optimal range of temperatures. This sudden reduction of the water temperature in the water heating device can be difficult to obtain.

This disadvantage is overcome in the second embodiment in that the heating element of the compensating device—by keeping at least one point of the duct at the prefixed temperature—reduces the temperature drop undergone by the water flowing along the duct. This allows reducing (e.g., to about 105-110° C.) said starting temperature at the switching on of the appliance and, thus, also the adjustment field of water temperature in the water heating device.

Advantageously, the compensating device is adapted to keep at least one further point of the duct at a further prefixed temperature. Advantageously, the compensating device is adapted to determine the amount of energy required to keep said at least one further point of the duct at the further prefixed temperature. According to this embodiment, the control device is adapted to continuously adjust the temperature of the water in the water heating device also based on said energy amount required to keep said at least one further point of the duct at said further prefixed temperature.

As described is detail hereinafter in the description, the choice of keeping one or more points of the duct at prefixed temperatures and the choice of the prefixed temperature values (which may be equal or different from each other) can depend on various factors, among which the duct length and the duct arrangement inside the appliance relative to the water heating device containing the heating source.

According to a third embodiment, the compensating device is adapted to keep the whole duct, or a major portion thereof, at a prefixed temperature. Advantageously, the compensating device comprises a heating element adapted to heat the whole duct, or said major portion thereof. Advantageously, the compensating device further comprises a temperature sensor adapted to detect the temperature of the heated duct. Advantageously, the compensating device further comprises a control element adapted to continuously check the temperature detected by the temperature sensor and to operate the heating element so as to approach the temperature detected by temperature sensor to the prefixed temperature.

This embodiment, by constantly keeping the whole duct (or a major portion thereof) at a prefixed desired temperature (e.g., at a temperature equal to, or slightly higher than, the optimal temperature for the production of the hot drink to be produced), make the water flowing along the duct to undergo no temperature drop or to undergo always the same predictable temperature drop, independently from the operating conditions of the appliance and from the climatic conditions of the outside environment.

This allows the water in the water heating device to be kept—independently from the operating conditions of the appliance and from the climatic conditions of the outside environment—always at the same temperature, which is determined based upon the fixed temperature drop undergone by the water along the duct.

According to an embodiment, the appliance of the invention comprises a further duct for feeding the produced hot drink from the seat to a predetermined location.

Said predetermined location is, for example, adapted to support a cup for the hot drink.

Advantageously, the appliance of the invention comprises a further compensating device associated with said further duct to dynamically compensate for temperature drop undergone by the water flowing along said further duct from the seat to the predetermined location.

As to the functional and structural features of the further compensating device reference is made to what already disclosed above.

Typically, the water heating device is a boiler. According to a variant, it is an instant hot water generator.

According to an embodiment of the appliance, at least one portion of the duct is in contact with (or in close proximity of) the walls of the water heating device. This advantageously allows limiting the temperature drop phenomenon of the water flowing along the duct, since portion of the duct walls, being in contact with the device walls, heats up also in the absence of hot water flowing therein. Moreover, this embodiment also allows limiting the number of heating elements and/or sensors to be associated with a duct.

According to a variant, at least one portion of the duct passes through the water heating device. Besides limiting the water temperature drop phenomenon along the duct and the number of heating elements and/or sensors to be associated with the same, this variant allows arranging the seat below the water heating device and thus realising a more compact appliance.

Typically, the appliance also comprises an atmospheric-pressure water tank. Advantageously, the appliance also comprises a pump for feeding water from the tank to the water heating device at a predetermined pressure.

Typically, the appliance also comprises water flow adjusting means associated with the duct, adapted to block/allow the water flow towards the seat. Typically, said means comprises a solenoid valve.

Advantageously, in the first embodiment of the compensating device, the temperature sensor of the compensating device is positioned at the water flow adjusting means, or downstream. This is advantageous because the water flow adjusting means typically is a relatively highly temperature dispersive device.

Advantageously, in the second embodiment of the compensating device, the heating element and temperature sensor of the compensating device are positioned at the water flow adjusting means, or downstream. This is advantageous because it allows heating the water passing (or passed) through the water flow adjusting means, which typically is a relatively highly temperature dispersive device.

In a second aspect thereof, the present invention relates to a method for adjusting the water temperature in an appliance for producing hot drinks, the appliance comprising a water heating device with a heating source, a seat for containing a product for preparing the hot drink and a duct for feeding the water from the water heating device to the seat, the method comprising a step a) of operating the heating source to bring the water temperature in the water heating device at a predetermined temperature, characterised in that it also comprises a step b) of dynamically compensating for temperature drop undergone by the water flowing along the duct from the water heating device to the product seat.

Advantageously, step b) comprises detecting a quantity indicative of the temperature drop undergone by the water flowing along the duct.

Preferably, said quantity is correlated to the temperature of at least one point of the duct.

Preferably, step b) comprises determining the predetermined temperature, at which bringing the water in the water heating device, based on said quantity.

In step b) said predetermined temperature is advantageously determined by a predefined algorithm that allows determining the value at which the temperature of the water contained in the water heating device must be brought, based on the detected quantity, in order to obtain an optimal production temperature for the water that reaches a predetermined product contained in the seat.

Advantageously, step a) comprises detecting the temperature of the water contained into the water heating device, and switching the heating source on/off according to the detected temperature so as to bring the water temperature in the water heating device towards the predetermined temperature value, as determined in step b) based on said quantity.

In step a), the temperature of the water contained in the device is advantageously determined directly (for example, by a temperature sensor housed into the device, directly in contact with the water contained therein). According to a variant, it is determined indirectly (for example, by detecting the temperature of the device walls, through a temperature sensor applied to an outer wall of the device).

According to a preferred embodiment, the quantity detected in step b) is the temperature of at least one point of the duct.

According to a more preferred embodiment, step b) comprises keeping at least one point of the duct at a prefixed temperature. Advantageously, step b) comprises determining the amount of energy required to keep said at least one point of the duct at the prefixed temperature. According to this embodiment, the quantity detected in step b) advantageously is said amount of energy.

According to a variant, step b) comprises keeping at least a major portion of the duct at a prefixed temperature.

Preferably, step b) is performed by keeping the whole duct at said prefixed temperature.

Further features and advantages of the present invention will appear more clearly from the following detailed description of a preferred embodiment, made with reference to the attached drawings. In such drawings, FIG. 1 shows a schematic view of an example of an appliance according to the invention;

Figure 1:
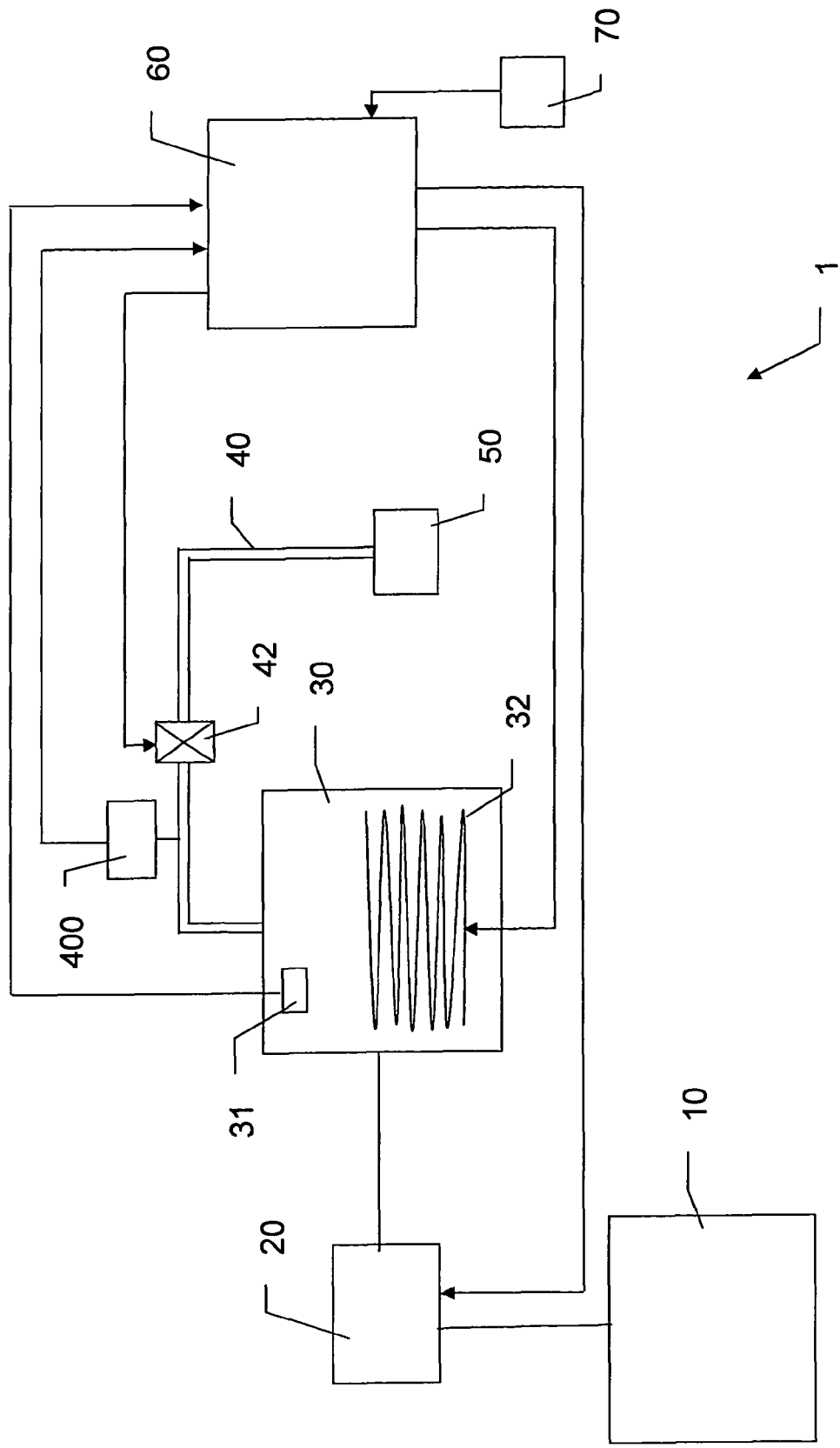

FIG. 1 schematically describes an example of an appliance 1 for producing hot drinks according to the invention comprising a tank 10 for containing water at atmospheric pressure, a water heating device 30 with a heating source 32, a pump 20 for feeding water from tank 10 to device 30, a seat 50 for containing a product for producing a hot drink, a duct 40 for feeding hot water from device 30 to seat 50, a sensor 31 associated with the water heating device 30, a compensating device 400 associated with the duct 40, a solenoid valve 42, selection means 70 and a control device 60.

Water heating device 30 can, for example, be a conventional boiler of the stagnant water type or a conventional instant hot water generator wherein water does not stagnate and is heated by flowing, for example, along a labyrinth path.

Heating source 32 typically is an armoured electrical resistance of the conventional type.

Temperature sensor 31 is, for example, a conventional negative temperature coefficient (NTC) probe.

In the illustrated embodiment, sensor 31 is housed into device 30 for directly detecting the temperature of the water contained in the device 30.

Solenoid valve 42 is adapted to block/allow the water flow along duct 40 towards seat 50.

Solenoid valve 42, pump 20 and tank 10 are made according to conventional techniques well known in the art.

The appliance 1 advantageously comprises also a safety system (not shown) of the conventional type adapted to cut off the supply to the heating source 32 in the event of overheating of the same.

Appliance 1 can, for example, be used for producing a single hot drink, such as coffee, or a plurality of hot drinks such as coffee, tea, hot chocolate, infusions of various types, barley, hot milk, cappuccinos, milk with coffee, etc.

In the second case, the selection means 70 allow the user selecting the desired type of hot drink, among the plurality of hot drinks that can be produced by appliance 1.

In general, as appliance 1 is switched on, the control device 60 is adapted to operate the heating source 32 so as to bring the temperature of water contained in device 30 at a predetermined optimum temperature.

The appliance 1 advantageously comprises suitable indicator means (not shown) adapted to indicate to the user that the appliance is ready for use, once the optimum temperature for the water contained in device 30 is reached.

In case of a request of production of hot drink by the user, the control device 60 is adapted to activate pump 20 so that it pumps water from tank 10 to water heating device 30 and to open solenoid valve 42 to allow hot water to flow, at a pressure determined by the thrust of pump 20, towards seat 50.

The hot drink is produced thanks to the arrival of hot water at a predetermined temperature (for example 90° C.) and at a predetermined pressure on seat 50 and to the flow of such hot water through the product contained in seat 50. An infusion pressure originates at seat 50, generated by the combination of two factors 1) thrust of pump 20 and 2) resistance offered by the product to the water flow through the same.

In the appliance 1 of FIG. 1, the compensating device 400 is operatively connected to the control device 60 to dynamically compensate for any temperature drops undergone with time by the hot water flowing through the duct 40 from the water heating device 30 to the seat 50, depending upon the operating conditions and climatic conditions of the outside environment of the appliance 1.

Advantageously, the compensating device 400 is adapted to continuously detect (e.g., at time intervals very close to each other) a quantity indicative of the water temperature drop along the duct 40 and the control device 60 is adapted to perform a continuous adjustment of the temperature of the water contained in the water heating device 30 based on the quantity each time detected by the compensating device 400.

In particular, the control device 60 is adapted to continuously check the quantity detected by the compensating device 400 and, upon each check:

- to determine, by an algorithm predefined according to the hot drink to be produced, an optimum temperature at which the water temperature in water heating device 30 must be brought,
- to check the temperature detected by sensor 31 associated with device 30,
- to switch (keep) the heating source 32 on if the temperature detected by sensor 31 is lower than the determined optimum temperature and to switch (keep) the heating source 32 off if the temperature detected by sensor 31 is higher than the determined optimum temperature, so as to bring the temperature of the water contained in device 30 close to the determined optimum temperature.

Said algorithm is advantageously adapted to obtain the temperature at which the water in the water heating device 30 must be brought, based on the quantity detected by the compensating device 400, in order to obtain the optimum temperature for the water that reaches a predetermined type of product contained in the seat 50.

Therefore, according to the invention, control device 60 is adapted to perform a dynamic adjustment of the water temperature so that—at the switching on of the appliance 1 or when the appliance is little used by the user at distant time intervals, when the duct walls are "cold" due to the absence or discontinuous flow of hot water therein—water in device 30 is kept at a higher temperature that takes into account a higher temperature drop undergone by the water flowing through the "cold" duct 40. In turn, in case of frequent use of the appliance, when the duct walls heat up thanks to the almost continuous flow of hot water therein, water in device 30 is kept at a lower temperature that takes into account the lower temperature drop undergone by the water flowing through the "hot" duct 40.

As a consequence, thanks to a continuous adjustment of the water contained in water heating device 30 based on the quantity each time detected by the compensating device 400, the appliance 1 of the invention allows keeping the temperature of the water that reaches the product constantly within the optimum temperature range for that specific product.

This allows excellent quality hot drinks to be constantly obtained and hot drinks to be always produced almost at the same temperature, irrespective of the operating conditions of the appliance and of the climatic conditions of the outside environment.

The Applicant notes that according to the type of appliance considered (for example, in the case of automatic hot drink dispensers and of espresso coffee makers for bars), the appliance of the invention can comprise a plurality of seats for producing a plurality of drinks and a single duct or multiple ducts for feeding water to the various seats.

In the case of multiple ducts, the appliance can comprise a compensating device associated with each duct and the control device shall be adapted to set the temperature of the water contained in the water heating device based on the quantity detected by the compensating device associated with the duct that feeds the water to the seat in use.

It is noted that in the case where one or more of such seats is used for producing a hot drink for which the production water temperature is not critical, the temperature of the water that reaches such seat/s could be adjusted by using only the temperature sensor 31 associated with the water heating device 30 and the use of a compensating device associated with the duct/s for feeding water to such seat/s could be avoided.

Moreover, the Applicant notes that according to the type of appliance considered, the appliance of the invention can comprise one or more ducts intended for the simple dispensing of hot water. Also in this case, where a fine adjustment of the temperature of the hot water dispensed is not required, the temperature adjustment could be carried out using only the temperature sensor 31 associated with the water heating device 30, without the need of associating any compensating device to such duct/s.

In case of multiple seats and a single duct, a suitable compensating device can be associated with the single duct and the control device 60 can be adapted to determine an optimum temperature value for the water in the water heating device 30 which allows to obtain, for the water that reaches the seat in use, the optimum production temperature for the preselected product.

The present invention can be used for implementing any appliance for producing hot drinks such as, for example, an espresso coffee maker for a typical household or bar use working with loose powder or granule products; or an automatic dispenser of hot drinks for a typical company use, typically working with loose powder or granule products; or an appliance for making hot drinks working with products pre-packaged into suitable wafers, capsules or bags.

Seat 50 shall therefore be shaped and manufactured according to conventional techniques so as to house the products (loose or pre-packaged) intended to be used with the type of appliance considered.

For example, according to the type of appliance considered, seat 50 can be adapted to be removed from appliance 1 to allow the user to arrange the desired product therein, such as, for example, in the case of some types of espresso coffee makers for household or bar use wherein the seat is provided with a grip and is adapted to be turned by the user in two opposite directions for allowing removal/introduction thereof. Or, seat 50 can be incorporated in appliance 1 and can be adapted to allow the user, according to techniques well known in the art, to introduce the pre-packaged wafer or capsule product therein (such as in the case of appliances for preparing hot drinks working with pre-packaged products) or it can be adapted to receive the loose product from special refillable containers housed into the appliance (such as in the case of automatic hot drink dispensers).

Figure 2:
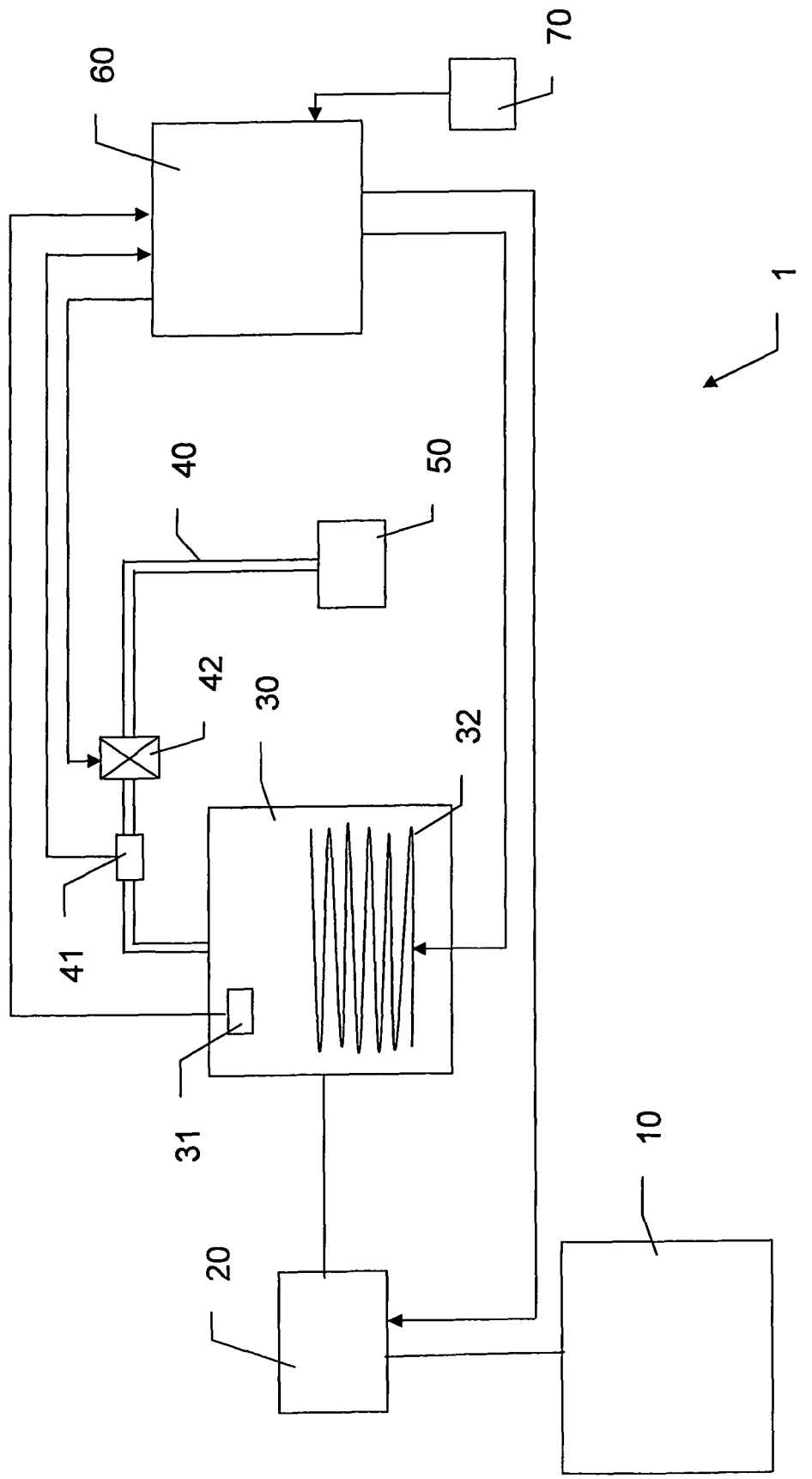
FIG. 2 shows a schematic view of a first embodiment of the appliance of FIG. 1.

FIG. 2 shows an embodiment of the appliance of FIG. 1 wherein the compensating device 400 comprises a temperature sensor 41 contacting the outer wall of duct 40 at a point thereof.

Temperature sensor 41 is, for example, a conventional negative temperature coefficient (NTC) probe.

In this embodiment the quantity detected by the compensating device 400 is the duct temperature detected by temperature sensor 41.

In the embodiment shown in FIG. 2 (and FIG. 1), duct 40 starts from device 30 to move away from it and ending in the proximity of seat 50, arranged laterally to device 30.

Figure 3:
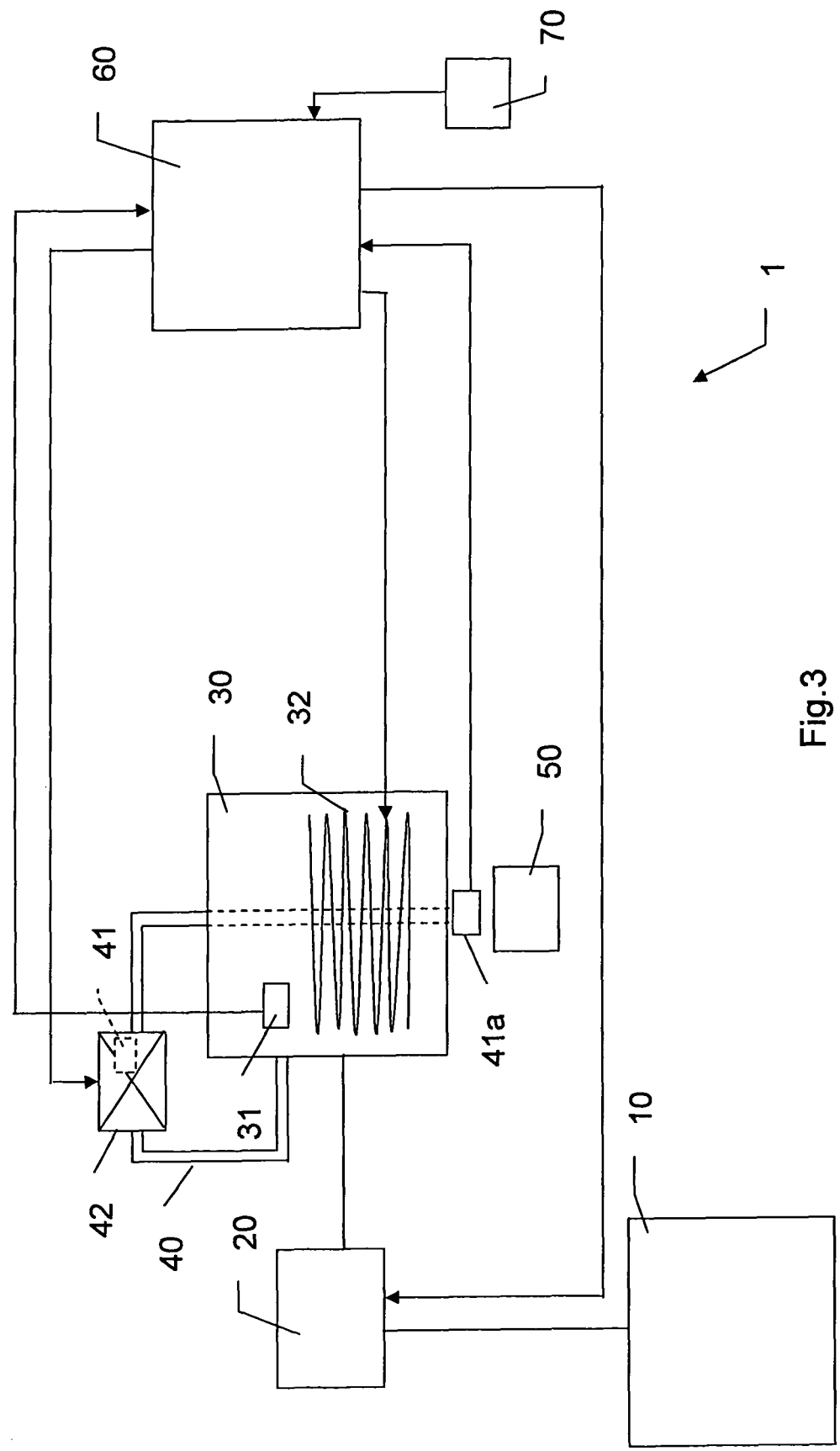
FIG. 3 shows a schematic view of a variant of the appliance of FIG. 2.

FIG. 3 shows a variant of the appliance 1 of FIG. 2. This variant is totally similar to the embodiment shown in FIG. 2 except for the fact that seat 50 is arranged below device 30 and that duct 40, which starts from device 30, ends in the proximity of seat 50 passing inside device 30. This variant is advantageous because it allows obtaining a more compactly shaped appliance. Moreover, it advantageously allows limiting the temperature drop phenomenon of the water flowing along the duct, since the walls of the portion of duct 40 inside appliance 30 heat up also in the absence of hot water flow therein.

Moreover, in the variant shown in FIG. 3, there are two sensors 41 and 41a associated with the duct 40, one arranged inside solenoid valve 42 and the other on the end portion of duct 40, in the proximity of seat 50.

According to the embodiment of FIGS. 2 and 3, the control device 60 is adapted to continuously operate the heating source 32 based on the temperature each time detected by sensor 41 (and, if present, 41a).

In the particular case of a single sensor 41 associated with duct 40, as shown in FIG. 2, the control device 60 is adapted to store a predefined algorithm [Td=f(Tc)] that allows determining the temperature value at which temperature Td detected by sensor 31 must be brought, based on temperature Tc each time detected by sensor 41, in order to obtain the optimum production temperature for the water reaching the product, that optimises the quality of the hot drink to be produced.

Different products can have different optimum production temperatures. For example, for coffee, the optimum production temperature range is comprised between about 89 and 92° C., for tea and other similar drinks between about 80-85° C.

Thus, the above algorithm shall be defined based on the type of product considered. If appliance 1 shall produce a plurality of hot drinks, the control device 60 shall be adapted to store a plurality of algorithms, one for each product or set of products having the same optimum production temperature range of the hot drink. The control device 60, moreover, shall be adapted to use the appropriate algorithm according to the hot drink to be produced, for example selected by the user by the above selection means 70.

Besides being defined based on the type of product considered, the above algorithm is defined also based on other factors that affect the sensitivity of sensor 41 and the temperature drop undergone by the water that flows through duct 40 such as the position of the second sensor 41 along duct 40, the length of duct 40, the diameter of duct 40, the thickness of the walls of duct 40, the material of the duct 40 and the arrangement of duct 40 inside appliance 1.

For example, in fact, a long duct 40 implies a higher temperature drop of the water flowing therethrough compared to a short duct 40, a metallic duct 40 implies a higher temperature drop of a plastic duct 40, a duct 40 arranged outside and away from device 30 (as shown in FIG. 2) implies a higher temperature drop compared to a duct 40 arranged in contact with the walls of device 30 or inside the same (as shown in FIG. 3). Moreover, a sensor arranged toward the end of the duct allows detecting information on the temperature of water in the proximity of the product but can cause delays in the continuous adjustment of the water temperature due to thermal inertia. In turn, a sensor arranged at the beginning of duct 30 allows improving the continuous water temperature adjustment in terms of thermal inertia but does not directly detect information on the temperature of water in the proximity of the product.

Thus, according to the cases, it may be useful to provide for multiple sensors arranged in different positions of the duct itself in order to provide more information to the control device 60.

In the exemplifying case of two sensors 41 and 41a (as illustratively shown in FIG. 3), the above algorithm shall be predefined so as to determine each time the temperature value Td at which the temperature detected by sensor 31 associated with the water heating device 30 must be brought based on temperature Tc1, Tc2 detected each time by the two sensors 41 and 41a associated with the duct [Td=f(Tc1, Tc2)], in order to obtain the optimum production temperature for the water reaching the product, that optimises the quality of the hot drink to be produced.

For example, considering:
- a production of coffee with an optimum production temperature range comprised between 89 and 92° C.,
- a 30 cm long duct having: a 20 cm long first portion of Teflon, external to device 30; and a 10 cm long second portion of stainless steel, internal to device 30 (as shown for example in FIG. 3); wherein the two duct portions both have outer diameter of 6 mm, inner diameter of 4 mm and a wall thickness of 1 mm;
- a first sensor arranged inside solenoid valve 42 and a second sensor arranged on the end portion of duct 40 at a distance of about 1.5 cm from seat 50 (as shown for example in FIG. 3), the Applicant has experimentally determined that the optimum temperature Td at which water into device 30 must be brought based on temperature Tc1 and Tc2 respectively detected by the first 41 and second 41a sensor on the duct can be determined by the following algorithm:

$$Td = TM + [(X1*(TM-Tc1) + X2*(TM-Tc2)]$$

where TM is a constant that, in the case considered, is equal to 100° C. and X1 and X2 are corrective values that vary as temperatures Tc1 and Tc2, respectively measured by the first 41 and by the second 41a sensor on the duct, vary.

Figure 4:
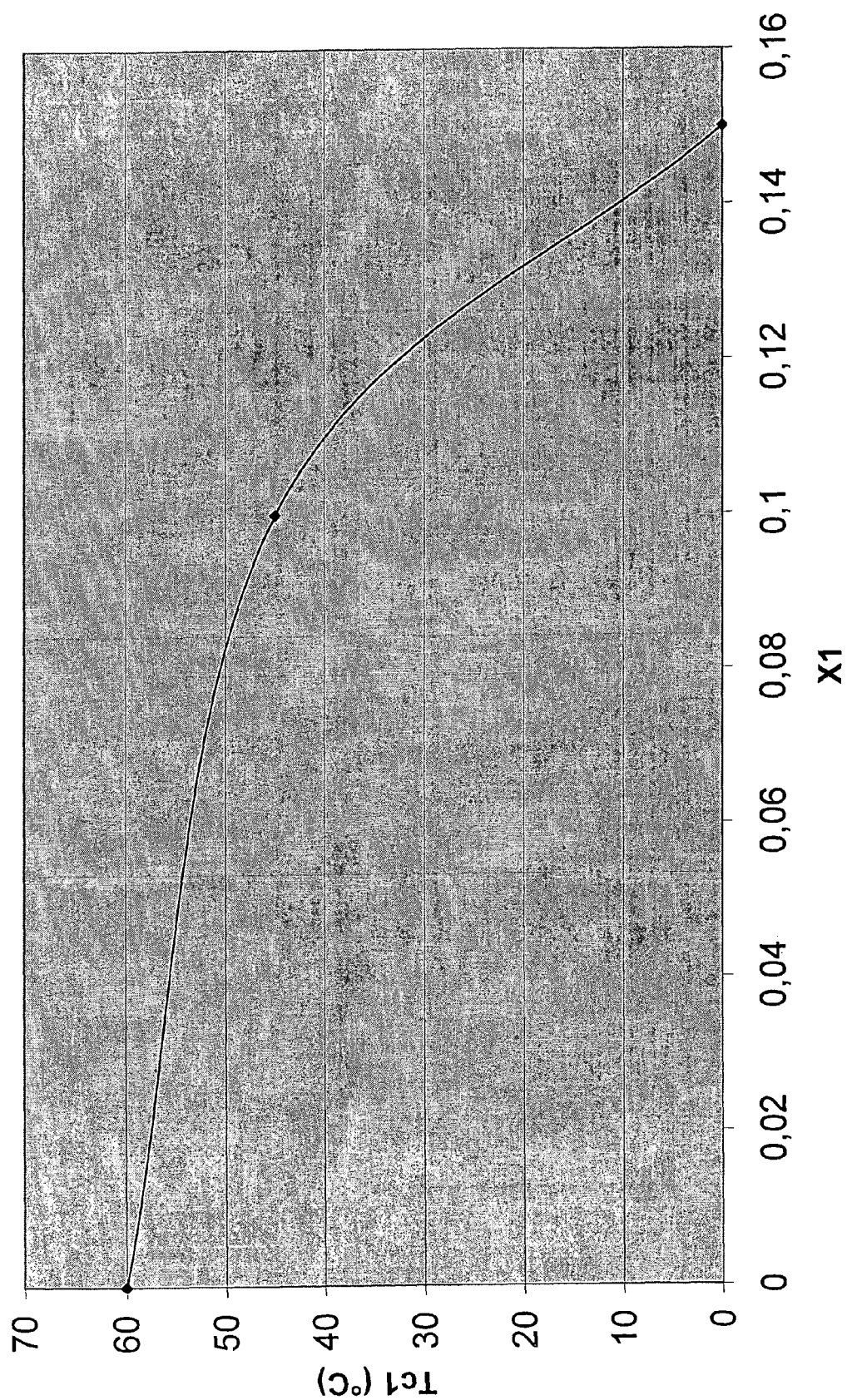
FIG. 4 shows an example of the pattern of temperature Tc1 measured by a first temperature sensor associated with the duct of an appliance according to the variant of FIG. 3 versus a quantity X1 to be used in the algorithm for calculating the optimum temperature at which the water contained in the water heating device must be brought.
Figure 5:
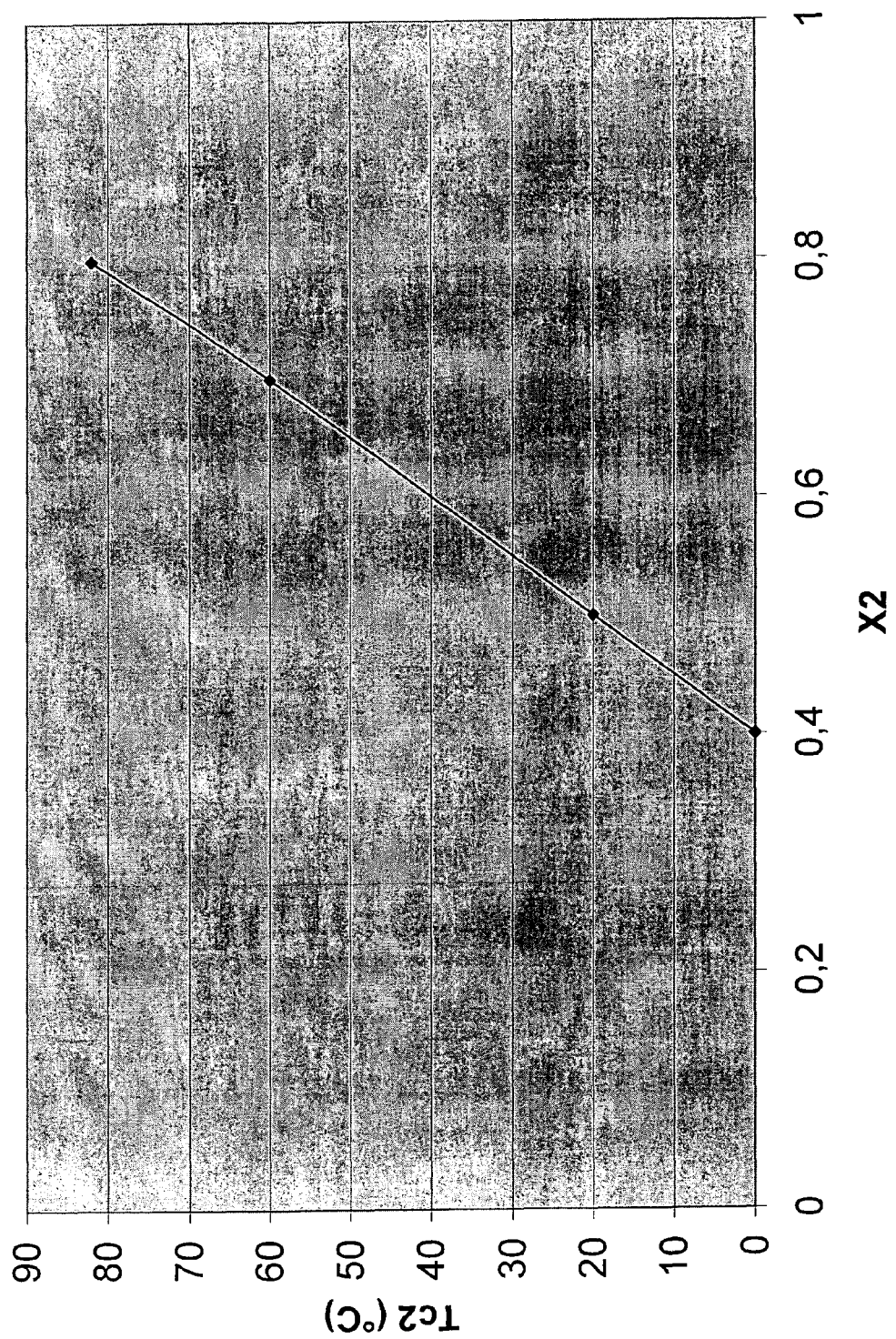
FIG. 5 shows an example of the pattern of temperature Tc2 measured by a second temperature sensor associated with the duct of an appliance according to the variant of FIG. 3 versus a quantity X2 to be used in the algorithm for calculating the optimum temperature at which the water contained in the water heating device must be brought.

The values taken by quantities X1 and X2 in the case under consideration, versus the temperature Tc1 and Tc2 detected by the first and by the second sensor are respectively indicated in the curves shown in FIGS. 4 and 5, experimentally obtained by the Applicant.

In the case under consideration, the control device 60 shall therefore be adapted to continuously check (for example every 0.1 or 0.01 s) the value of temperatures Tc1 and Tc2 detected by the two sensors associated with the duct 40, to determine the values of quantities X1 and X2 from curves shown, to calculate the optimum temperature value Td through the above algorithm and to operate the heating source 32 so as to approach the water temperature in the water heating device 30 to said optimum temperature value Td, thereby obtaining the optimum production temperature for the water that reaches the product in seat 50.

Figure 6:
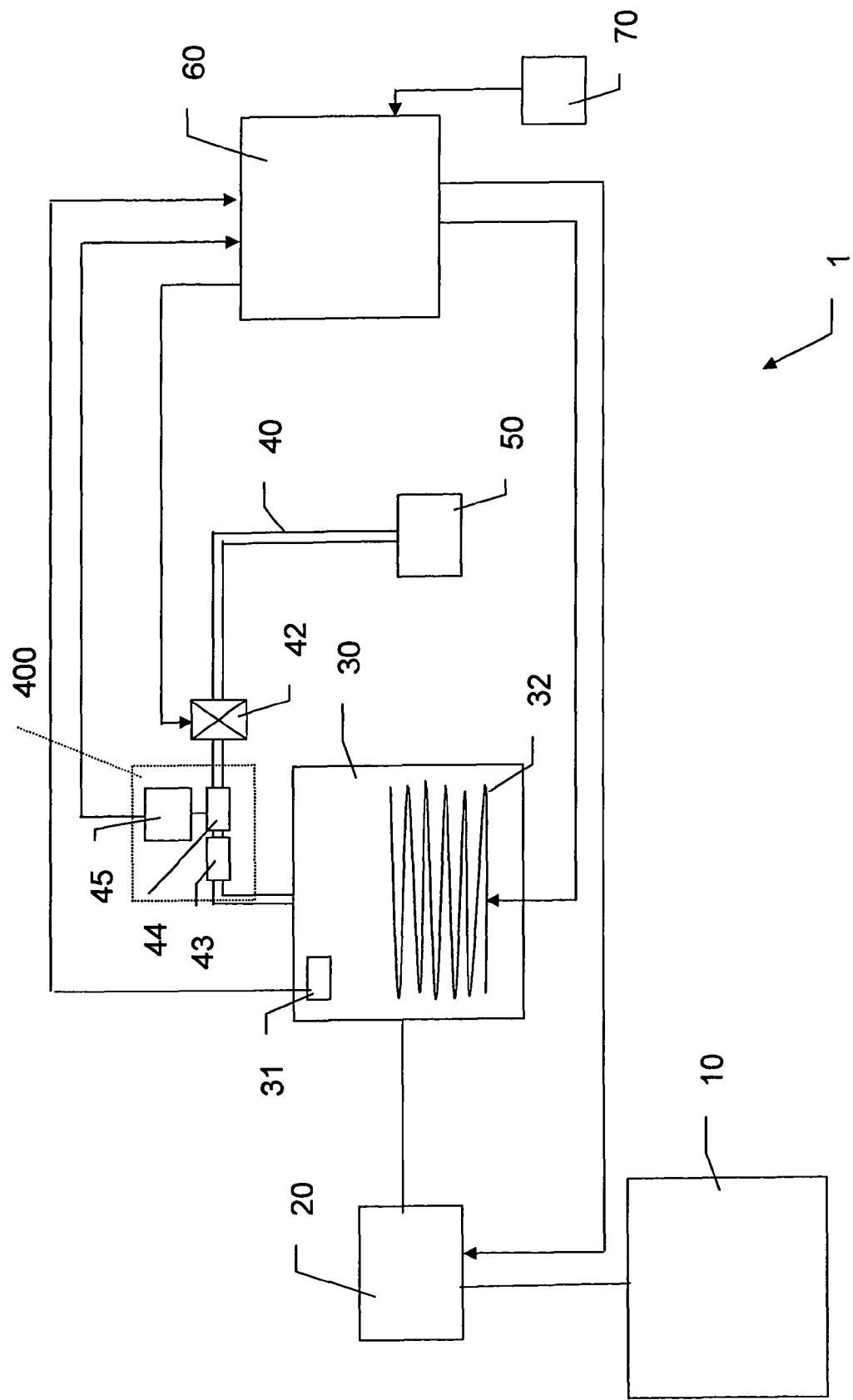
FIG. 6 shows a schematic view of a second embodiment of the appliance of FIG. 1.

FIG. 6 shows a preferred embodiment of the appliance of FIG. 1 wherein the compensating device 400 comprises a heating element 43 and a temperature sensor 44, both associated with the duct 40, and a control element 45.

The heating element 43 is, for example, an electrical resistance of the conventional type.

Temperature sensor 44 is, for example, a conventional negative temperature coefficient (NTC) probe.

Heating element 43, temperature sensor 44 and control element 45 cooperate so as to keep at least one point of duct 40 at a prefixed temperature.

This allows the water flowing along duct 40 to be heated when passing at said heated point of duct 40.

In particular, heating element 43 is adapted to heat said at least one point of duct 40; temperature sensor 44 is adapted to detect the temperature of the heated point of duct 40; and control element 45 is adapted to continuously check the temperature detected by temperature sensor 44 and to operate the heating element 43 so as to approach the temperature detected by temperature sensor 44 to the prefixed temperature.

Advantageously, said prefixed temperature is higher than the optimum production temperature for a predetermined product (e.g., it is equal to about 105-110° C. in case of coffee production).

Advantageously, the control element 45 is also adapted to continuously determine (e.g., every 0.01 s) the amount of thermal energy per unit of time required to keep said at least one point of duct 40 at the prefixed temperature.

Said amount of energy is indicative of the temperature of the duct walls and, thus, of the temperature drop undergone with time by water, while flowing along the duct. Indeed, at the switching on of the appliance 1 or when the appliance is used by the user at distant time intervals, when duct 30 (or at least a portion thereof external to device 30 and not in contact with the walls of device 30) is "cold" and the water temperature drop is higher—the amount of energy required to keep said point at the prefixed temperature will be higher. In turn, in case of frequent use of the appliance, when the duct walls heat up and the water temperature drop is lower, the amount of energy required to keep said point at the prefixed temperature will be lower.

Accordingly, in this embodiment, the quantity used by the control device 60 to continuously adjust the water temperature in the water heating device 60 is the amount of energy each time determined by the control element 45.

In particular, the control device 60 is adapted to store a predefined algorithm [Td=f(En)] that allows determining the temperature value at which temperature Td detected by sensor 31 must be brought, based on the energy amount En each time determined by the control element 45, in order to obtain the optimum production temperature for the water reaching the product, that optimises the quality of the hot drink to be produced.

Besides being defined based on the type of product considered, the above algorithm is defined also based on other factors that affect the temperature drop undergone by the water that flows through duct 40 such as the length of duct 40, the diameter of duct 40, the thickness of the walls of duct 40, the material of the duct 40 and the arrangement of duct 40 inside appliance 1.

Further to the above-mentioned advantages of the appliance of invention, the embodiment of FIG. 6 has the advantage of reducing the adjustment field of water temperature in the water heating device 30. Indeed, by heating a point of the duct 40 at a prefixed temperature, it allows at the switching on of the appliance 1, or when "cold" (e.g., at ambient temperature) water is fed to the water heating device 30 from tank 10—the starting temperature of the water in the water heating device 30 to be kept at a lower value (e.g., 105-110° C.) than in the embodiment of FIGS. 2 and 3 wherein the starting temperature has to be higher (e.g., 140° C.) to compensate for a higher temperature drop along the duct.

Preferably, the heating element 43 and the temperature sensor 44 are arranged on the solenoid valve 42 or downstream in that solenoid valve 42 typically is a highly temperature dispersive component.

The Applicant notes that according to the invention the compensating device 400 can also be adapted to keep a plurality of points (or portions) of duct 40 at a respective prefixed temperature and to determine the amount of energy required to keep each point at the respective prefixed temperature.

In this case, the control device 60 will be adapted to continuously adjust the water temperature in the water heating device 30 depending upon the plurality of energy amounts determined by such compensating device, so as to keep the water reaching the product in the set 50 within the optimum production temperature range.

Figure 7:
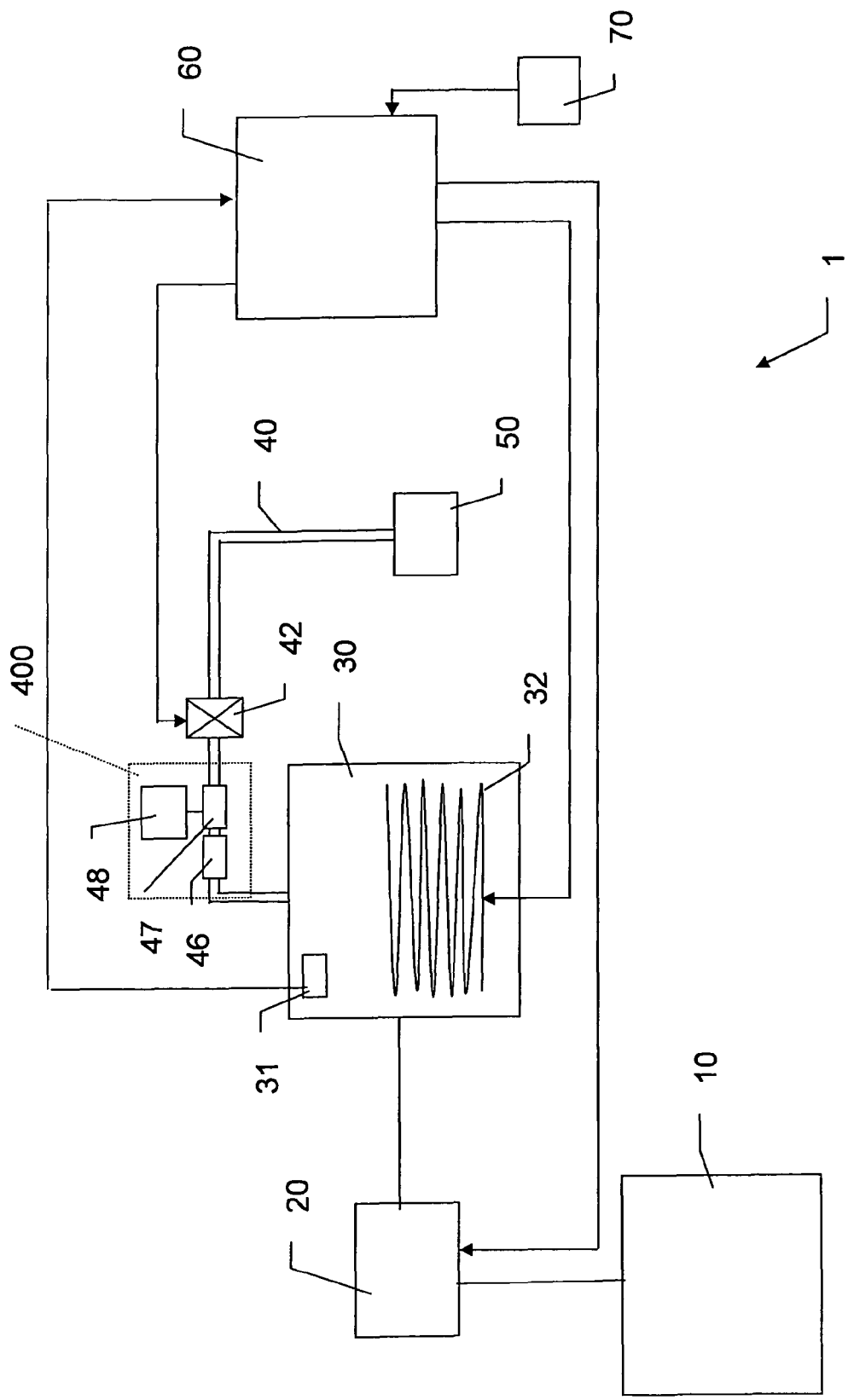
FIG. 7 shows a schematic view of a third embodiment of the appliance of the invention.

FIG. 7 shows another embodiment of the appliance of the invention wherein the compensating device 400 is not operatively connected to the control device 60 and comprises a heating element 46 and a temperature sensor 47, both associated with the duct 40, and a control element 48.

The heating element 46 is, for example, an electrical resistance of the conventional type.

Temperature sensor 47 is, for example, a conventional negative temperature coefficient (NTC) probe.

Heating element 46, temperature sensor 47 and control element 48 cooperate so as to keep the whole duct 40, or a major portion thereof, at a prefixed temperature.

In particular, heating element 46 is adapted to heat the whole duct 40, or the major portion thereof; temperature sensor 47 is adapted to detect the temperature of the heated duct 40; and control element 48 is adapted to continuously check the temperature detected by temperature sensor 47 and to operate the heating element 46 so as to approach the temperature detected by temperature sensor 47 to the prefixed temperature.

Advantageously, the prefixed temperature is equal to or slightly higher than the optimum production temperature for a predetermined product (e.g., about 90-95° C. in case of coffee production).

As the whole duct 40 is constantly kept at the prefixed temperature, the water flowing along the duct undergoes substantially always the same predictable temperature drop, independently from the operating conditions of the appliance and of the climatic conditions of the ambient.

The temperature drop depends, among other things, upon the difference between the water temperature in the water heating device 30 and the prefixed temperature at which the duct 40 is constantly kept, and upon the weight and the material of duct 40. The temperature drop may be null when the water temperature in the water heating device 30 and the prefixed temperature of the duct 40 are the same (e.g., equal to the optimum production temperature for a predetermined product).

In this embodiment—wherein the water flowing along the duct undergoes substantially always the same prefixed temperature drop, known by the manufacturer of the appliance—the optimum temperature for the water in the water heating device can be determined beforehand by the manufacturer, depending upon said prefixed temperature drop.

The Applicant notes that, in general, the appliance of the invention allows achieving the above mentioned advantages without substantially affecting the cost of the same. In fact, compared to known appliances, it only requires the use of at least one further temperature sensor associated with the duct (embodiments of FIGS. 2 and 3) or at least one further heating element and temperature sensor (embodiments of FIGS. 6 and 7), which are standard products available on the market at very low cost, and the use of control means (e.g., a microprocessor, embodiments of FIGS. 2, 3 and 6), already present in a conventional appliance.

The invention claimed is:

1. An appliance for producing hot drinks comprising:
   a water heating device comprising a heating source;
   a seat adapted receive a product for preparing the drink;
   a duct for feeding hot water from the water heating device to the seat;
   a control device operatively associated with the heating source for adjusting the temperature of the water contained in the water heating device;
   a compensating device to perform a compensation, varying with time, for temperature drop undergone by the water flowing along the duct from the water heating device to the seat, the compensating device comprising a heating element to heat at least one point of the duct at a prefixed temperature, wherein the compensating device determines an amount of energy required to keep said at least one point of the duct at said prefixed temperature and the control device adjusts the temperature of the water in the water heating device based on the determined energy amount.

2. The appliance according to claim 1 wherein the compensating device comprises a temperature sensor detecting the temperature of the heated point of the duct.

3. The appliance according to claim 2, wherein the compensating device further comprises a control element that checks the temperature detected by the temperature sensor and operates the heating element so as to approach the temperature detected by temperature sensor to said prefixed temperature.

4. The appliance according to claim 1, wherein the compensating device keeps at least one further point of the duct at a further prefixed temperature.

5. The appliance according to claim 4, wherein the compensating device determines the amount of energy required to keep said at least one further point of the duct at said further prefixed temperature.

6. The appliance according to claim 5, wherein the control device adjusts the temperature of the water in the water heating device also based on said energy amount required to keep said at least one further point of the duct at said further prefixed temperature.

7. The appliance according to claim 1, further comprising a valve blocking/allowing water flow towards the seat, wherein the heating element is positioned at the valve, or downstream of the valve.

8. A method for adjusting the water temperature in an appliance for producing hot drinks, the appliance comprising a water heating device with a heating source, a seat for containing a product for preparing the hot drink, a duct for feeding the water from the water heating device to the seat, the method comprising: performing a compensation, varying with time, for temperature drop undergone by the water flowing along the duct from the water heating device to the seat, by:
 heating at least one point of the duct at a prefixed temperature;
 determining an amount of energy required to keep said at least one point of the duct at said prefixed temperature; and
 adjusting the temperature of the water in the water heating device based on the determined energy amount.

9. The method of claim 8, further comprising:
 determining an optimum temperature value at which the temperature of the water in the water heating device must be brought, based on the determined energy amount, and
 switching off/switching on the heating source so that the temperature in the water heating device approaches the optimum temperature so determined.

* * * * *